INVENTORS
WALTER H. HOLCROFT
MATHEW R. LARSON
BY
ATTORNEYS

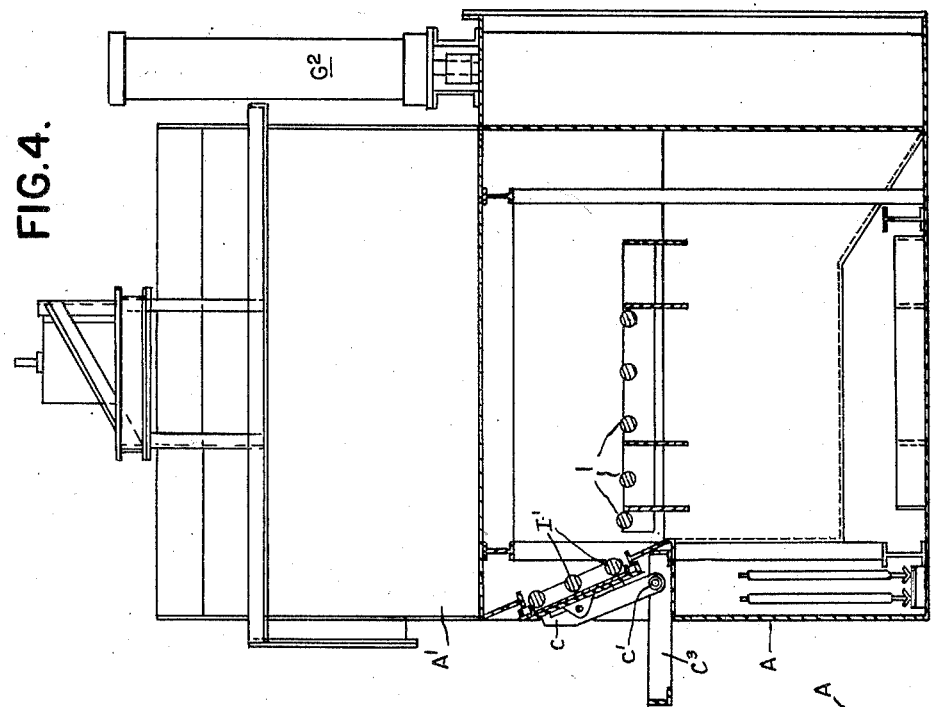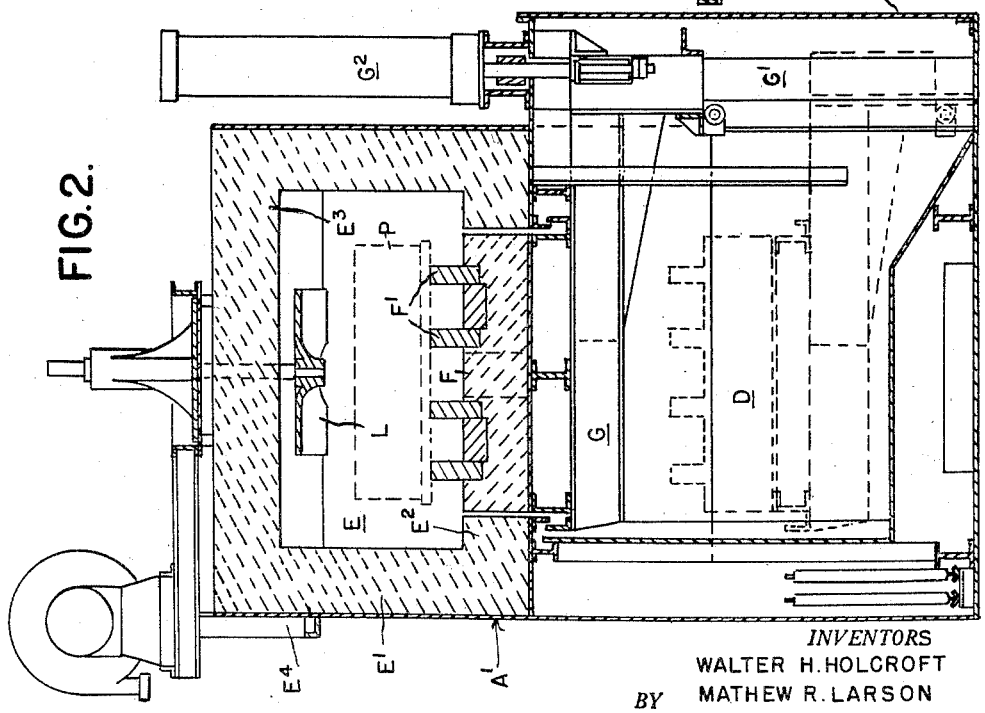
INVENTORS
WALTER H. HOLCROFT
MATHEW R. LARSON
BY
ATTORNEYS

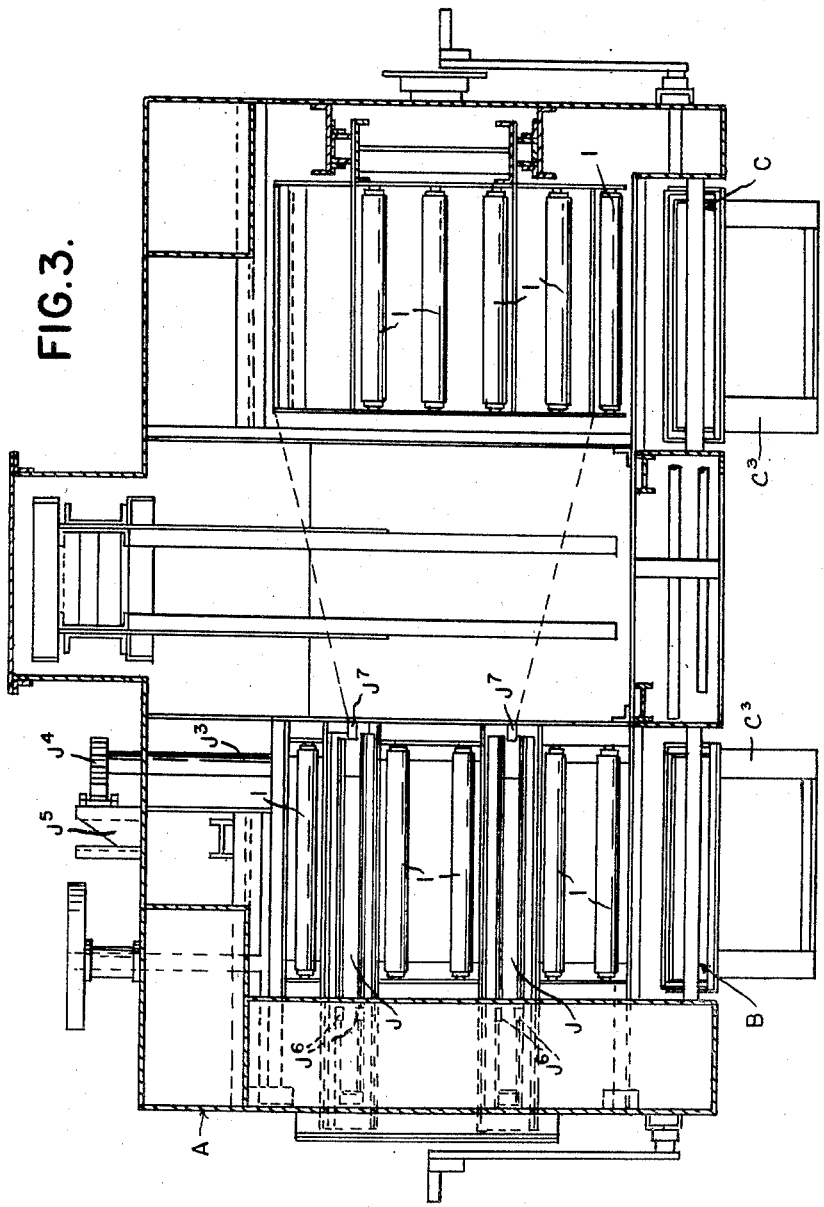

United States Patent Office 2,819,055
Patented Jan. 7, 1958

2,819,055

HEAT TREATING FURNACE

Walter H. Holcroft and Mathew R. Larson, Detroit, Mich., assignors to Holcroft & Company, Detroit, Mich., a corporation of Michigan Application April 25, 1955, Serial No. 503,470

7 Claims. (Cl. 266—4)

The invention relates to heat treating furnaces and more particularly those of the batch type.

It is the object of the invention to obtain a construction having various advantages which include (1) Occupation of relatively small floor space;
(2) Heating from a source of heat above the floor level and thus making better working conditions;
(3) Eliminating loss of time in charging the furnace chamber because of having vestibule flushing times substantially equal to heating time;
(4) Fast quench in either hot oil or cold oil;
(5) Avoiding exposure to oxidizing atmosphere between removal from the heat treating chamber and quenching;
(6) Elimination of manual pushing and hauling of hot trays;
(7) Obtaining a construction which can be completely automatic in operation.

With these and other advantageous features in view the invention consists in the construction as hereinafter set forth.

In the accompanying drawings:

Fig. 2 is a cross section on line 2—2, Fig. 1.

Fig. 3 is a horizontal section on line 3—3, Fig. 1.

Fig. 4 is a vertical section on line 4—4, Fig. 1.

Figure 1:
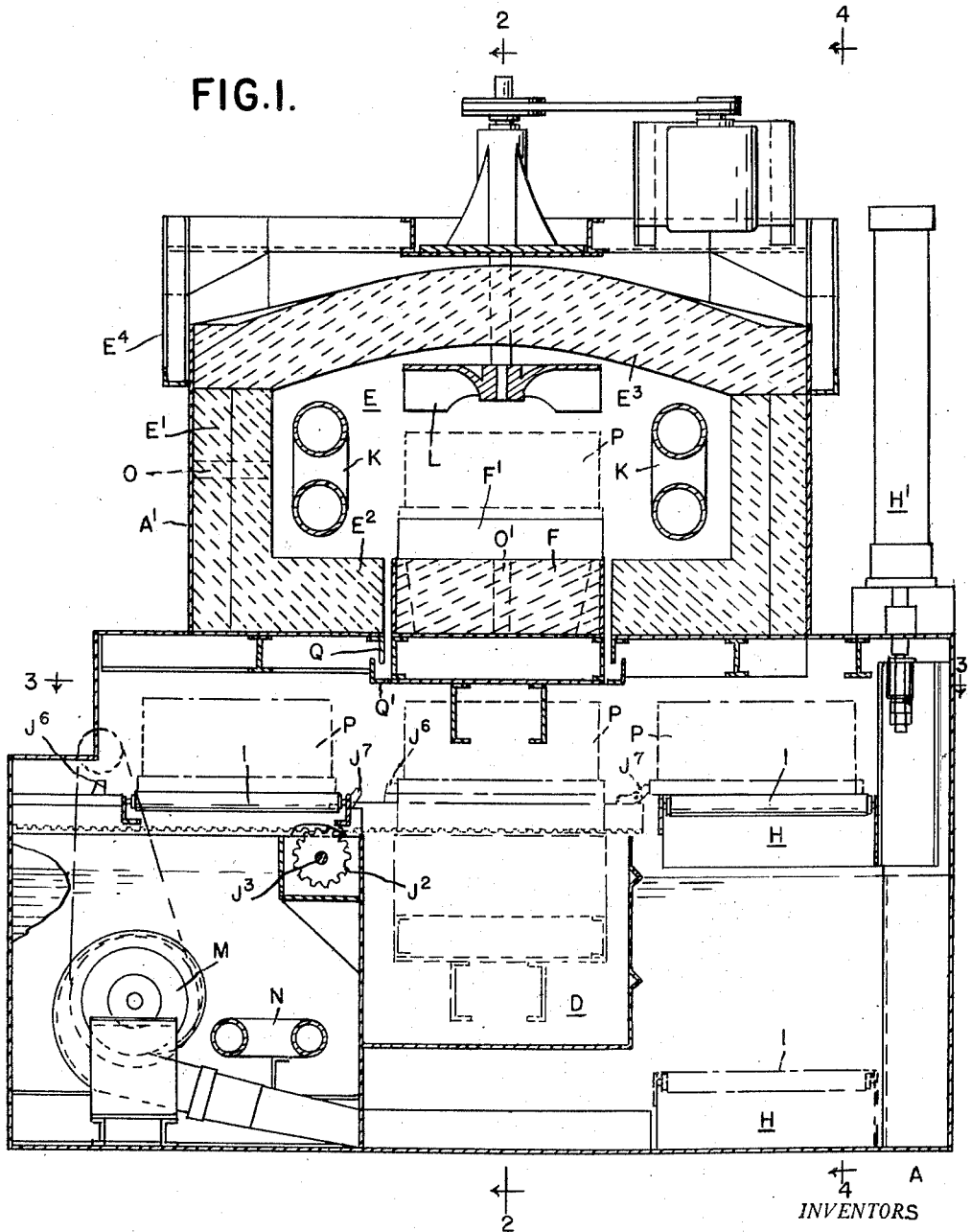
Fig. 1 is a central longitudinal section through the furnace.

Heat treating furnaces of the batch type are sometimes of the pit type in which the work is generally handled manually into and out from the furnace located below the floor level, thus exposing heated work to external atmosphere. In another type, such as in former patent to Walter H. Holcroft, No. 2,669,445, both the furnace and the quench tank are above the floor level arranged side by side which necessitates using more floor space and loss of furnace time due to time requirement for flushing vestibule. With our improved construction the heat treating chamber is arranged above a vestibule chamber which also forms the quench tank, thereby conserving floor space and avoiding any travel of the heated work through the external atmosphere, and eliminating lost time used in flushing vestibule.

As shown in Fig. 1, A is a housing which may be of metallic construction and is welded or gasketed so as to be gas and liquid tight and contains the oil or other quenching medium. At opposite sides of the front of this housing are entrance and discharge openings normally closed by doors B and C and arranged above the level of the liquid in the housing. The doors are hinged at their lower ends as indicated at C' Fig. 4, so that in opening they may be turned down into horizontal position and are supported on a frame $C^3$. Above the housing A and connected thereto is a gas tight metallic housing A' containing a furnace or heat treating chamber E. This chamber has a bottom opening through which work is introduced from the chamber in the housing A beneath the same, which latter constitutes a vestibule. The housing A' is lined with refractory material, including walls E', bottom $E^2$ and an arched top $E^3$. There is also an external reinforcing metallic frame $E^4$. Centrally of the bottom $E^2$ registering with the opening between the two chambers is a removable refractory closure F. This is supported by a cantilever arm G mounted on slideways G' at the rear of the housing A. This portion of the housing A extends beyond the rear wall of the housing A' and a hydraulic or pneumatic cylinder $G^2$ mounted adjacent to this wall is connected to said cantilever arm to raise or lower the same. Within the lower portion of the housing A which contains the quenching fluid there is formed a dry well D which provides space for the lowering thereinto of the closure member F and cantilever arm G and which rises slightly above the level of the door openings. To the right of this dry well (Fig. 1) is located an elevator H operated by a hydraulic cylinder H' to lower work supported thereby into the tank and to raise it after quenching. For transporting the work through the vestibule chamber series of rolls I extend from the entrance and exit openings to the center portion of the housing A respectively to the left and to the right (Fig. 1) of the dry well D in alignment with rolls I' on the open doors. At the center and normally to the left is a carriage, including spaced bars J, J' having racks on their under faces which engage gear wheels $J^2$ on a shaft $J^3$ extending out through the rear of the housing A. This shaft is intermittently rotated through suitable gearing $J^4$ by the piston of a hydraulic or pneumatic cylinder $J^5$. When the shaft $J^3$ is rotated in one direction the bars J, J' of the carriage will be moved to the right over the dry well D and when rotated in the opposite direction the carriage will be returned to its normal position.

Radiant heaters K are arranged in the heat treating chamber E on opposite sides of the center and a fan L is arranged at the center beneath the arched top $E^3$ for circulating the gas within the chamber. A pump M circulates the quenching fluid and heating coils N and cooling coils N' are used to maintain the quenched fluid at the desired temperature. A suitable non-oxidizing gas or treating gas of a different character is introduced into the chamber E through a pipe O and from the chamber gas passes out through an opening O' into the vestibule chamber.

With the construction as above described the operation is as follows:

The work to be heat treated is placed in trays P which are introduced into the vestibule chamber over the rolls I where by means of the carriage bars J, J' they are transferred onto the bottom closure F when the latter is in its lowered position. Spaced refractory rails $F^1$, preferably formed of silicon carbide, support the tray on the member F and carry it upward into the heat treating chamber E when the cantilever arm G is raised by the cylinder $G^2$. Dogs $J^6$ on the bars J, $J^1$ in rear of the tray advance it onto the rails $F^1$ and latch dogs $J^7$ also on the bars J, $J^1$ in advance of the tray serve to transfer a tray from the rails $F^1$ onto the rolls I of the elevator H. In the complete cycle of operation when the doors B and C are opened a tray containing untreated work is introduced over the rolls I and I' and simultaneously a tray containing quenched work is removed over rolls through the discharge door C. The heat treatment period may be from a few minutes to several hours in length and during that time the gas escaping from the heat treating chamber through the opening O' will purge the vestibule chamber from oxidizing atmosphere.

When the heat treatment period has been completed closure F is lowered, the top of rails $F^1$ line up with the top of rolls I, carriage bars J, $J^1$ are actuated moving the tray from rail $F^1$ onto the elevator H by means of latch dogs $J^7$ and at the same time moving tray previously introduced through door B onto rails F¹ by means of dogs J⁶.

The closure F is then raised to carry the tray into the heat treating chamber which is sealed by depending flanges Q surrounding the opening through the bottom of the furnace chamber and channels Q¹ carried by the cantilever arm and containing granular material or other sealing material into which the flanges Q extend.

Elevator H is lowered into the quenching medium. As the quenching time is normally short as compared to the heat treatment time, the tray being quenched may be very shortly removed and the cycle repeated by introducing another tray containing untreated work through door B.

What we claim as our invention is:

1. A heat treating furnace comprising a normally closed and sealed metallic housing, a refractory lining in the upper central portion of said housing enclosing the heat treating chamber, a separate vestibule chamber beneath said heat treating chamber provided with work inlet and exit openings, a liquid holding quench well in the lower portion of said vestibule chamber, a casing forming a dry well within said quench well beneath said heat treating chamber, an elevator in said dry well for raising and lowering work between said vestibule and heat treating chamber, doors for closing and sealing said entrance and exit openings, conveyor means for the work between the entrance side and the elevator and between the elevator and exit side, and means at the latter side for lowering the work into the quench well and for raising the same.

2. The construction as in claim 1 in which said elevator has a refractory platform forming a closure for an opening in the bottom of said heat treating chamber when the work is under treatment therein, and refractory rails on said platform onto which the work is pushed and from which it is removed by said conveyor means in the lowered position of the elevator.

3. The construction as in claim 1 provided with means for constantly introducing a non-oxidizing gas into said heat treating chamber and displacing hot gas from said chamber downward into said vestibule chamber, whereby air entering the vestibule from outside when the doors are open will be purged therefrom during the heat treatment period by said downwardly moving hot gas.

4. The construction as in claim 1 in which said dry well casing extends beyond other portions of said housing and in rear thereof, a fluid operating motor in rear of said housing having a depending actuated member extending into said dry well and a cantilever arm on said actuated member supporting said elevator platform to raise and lower the same.

5. The construction as in claim 1 in which said doors are hinged at their bottom edges and when open extend horizontally at substantially the level of said conveyor means for supporting the work while entering and leaving.

6. The construction as in claim 5 provided with rolls on the inside of said doors and rolls at the same level within the vestibule over which rolls the work travels to and from said conveyor means.

7. A heat treating furnace comprising a housing containing a heat treating chamber in the upper portion thereof, means for maintaining a controlled atmosphere in said chamber, a separate vestibule chamber beneath said heat treating chamber provided with work inlet and exit openings, doors normally closing said openings, means for purging the atmosphere of said vestibule chamber between intervals in which said doors are opened by gas from said heat treating chamber, elevator means for raising work from said vestibule chamber into said heat treating chamber and for returning it after heat treatment, a dry well in the vestibule chamber into which said first mentioned elevator is lowered, a quench medium located in the lower portion of said vestibule chamber into which the work removed from said heat treating chamber is introduced prior to the opening of said doors, and separate elevator means for lowering work from said vestibule into said quench medium and for raising the same.

References Cited in the file of this patent

UNITED STATES PATENTS

| Number | Name | Date |
|---|---|---|
| 955,989 | Pedersen | Apr. 26, 1910 |
| 1,073,235 | Hillebrand | Sept. 16, 1913 |
| 1,168,313 | Kenworthy | Jan. 18, 1916 |
| 2,383,203 | Lee | Aug. 21, 1945 |
| 2,639,138 | Dow | May 19, 1953 |
| 2,669,445 | Holcroft | Feb. 16, 1954 |

FOREIGN PATENTS

| Number | Country | Date |
|---|---|---|
| 18,082 | Great Britain | Aug. 6, 1912 |
| 271,875 | Germany | Mar. 19, 1914 |